(12) United States Patent
Takeda et al.

(10) Patent No.: US 11,626,965 B2
(45) Date of Patent: Apr. 11, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 2 days.

(21) Appl. No.: 16/960,743

(22) PCT Filed: Jan. 11, 2018

(86) PCT No.: PCT/JP2018/000543
§ 371 (c)(1),
(2) Date: Jul. 8, 2020

(87) PCT Pub. No.: WO2019/138521
PCT Pub. Date: Jul. 18, 2019

(65) Prior Publication Data
US 2020/0358586 A1   Nov. 12, 2020

(51) Int. Cl.
*H04L 5/00*   (2006.01)
*H04W 72/12*   (2023.01)

(52) U.S. Cl.
CPC ............ *H04L 5/0098* (2013.01); *H04L 5/001* (2013.01); *H04L 5/0042* (2013.01); *H04W 72/1289* (2013.01)

(58) Field of Classification Search
CPC ..... H04L 5/0098; H04L 5/001; H04L 5/0042; H04L 5/0044; H04L 5/0053; H04W 72/1289; H04W 72/042; H04W 72/0453
See application file for complete search history.

(56) References Cited

U.S. PATENT DOCUMENTS

| | | | | |
|---|---|---|---|---|
| 2014/0177547 A1* | 6/2014 | Guo | ...................... | H04L 5/0037 370/329 |
| 2018/0049203 A1* | 2/2018 | Xue | ........................ | H04L 5/0058 |
| 2019/0150148 A1* | 5/2019 | Ouchi | ................... | H04L 1/1854 370/336 |

OTHER PUBLICATIONS

Catt; "On PDSCH and PUSCH resource allocation"; 3GPP Tsg Ran WG1 Meeting 91, R1-1721416; Reno, USA; Nov. 27-Dec. 1, 2017 (13 pages) (Year: 2017).*
Extended European Search Report issued in counterpart European Patent Application No. 18899808.2, dated Jul. 23, 2021 (9 pages).
(Continued)

*Primary Examiner* — Hardikkumar D Patel
(74) *Attorney, Agent, or Firm* — Osha Bergman Watanabe & Burton LLP

(57) ABSTRACT

The present invention is designed to improve the throughput of radio communication by using partial frequency bands for DL/UL communication. A user terminal has a receiving section that receives downlink control information by using a first partial frequency band (BWP) among a plurality of BWPs configured in a carrier, and a control section that identifies, via a resource allocation field (RA field) having a size that is configured based on a given BWP among the plurality of BWPs, a resource of a second BWP, which is different from the first BWP, in the downlink control information.

5 Claims, 15 Drawing Sheets

(56) References Cited

OTHER PUBLICATIONS

Catt; "On PDSCH and PUSCH resource allocation"; 3GPP TSG RAN WG1 Meeting 91, R1-1721416; Reno, USA; Nov. 27-Dec. 1, 2017 (13 pages).
Huawei, HiSilicon; "Remaining issues on bandwidth part"; 3GPP TSG RAN WG1 Meeting #90bis, R1-1717077; Prague, Czech Republic; Oct. 9-13, 2017 (11 pages).
Intel Corporation; "Remaining details on TBS determination and resource allocation"; 3GPP TSG RAN WG1 Meeting #91, R1-1720094; Reno, USA; Nov. 27-Dec. 1, 2017 (14 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting NR#3; R1-1715425 "Overview of bandwidth part, CA, and DC operation including SRS switching" Huawei, HiSilicon; Nagoya, Japan; Sep. 18-21, 2017 (16 pages).
International Search Report issued in International Application No. PCT/JP2018/000543, dated Apr. 3, 2018 (3 pages).
Written Opinion issued in International Application No. PCT/JP2018/000543; dated Apr. 3, 2018 (3 pages).

\* cited by examiner

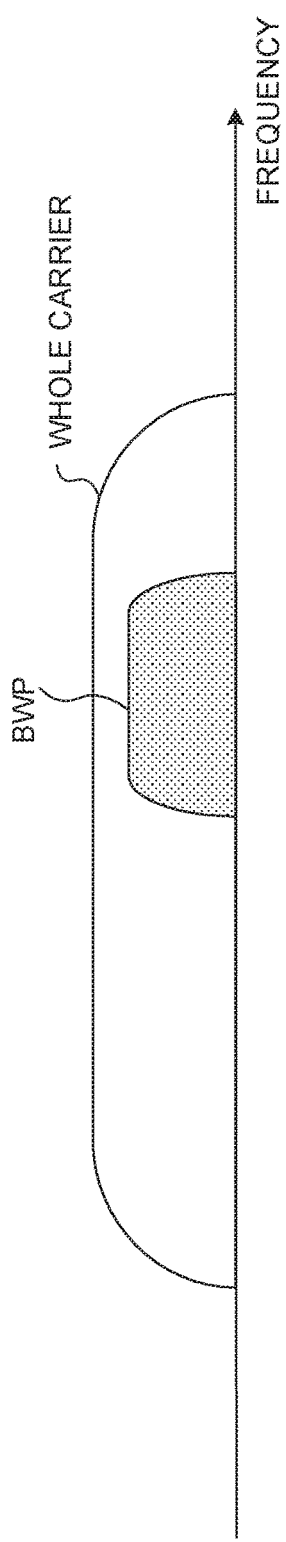
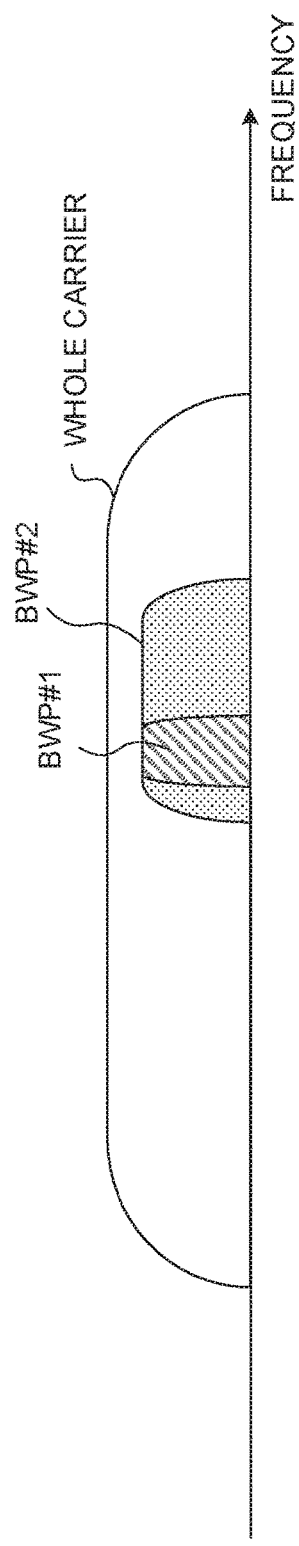
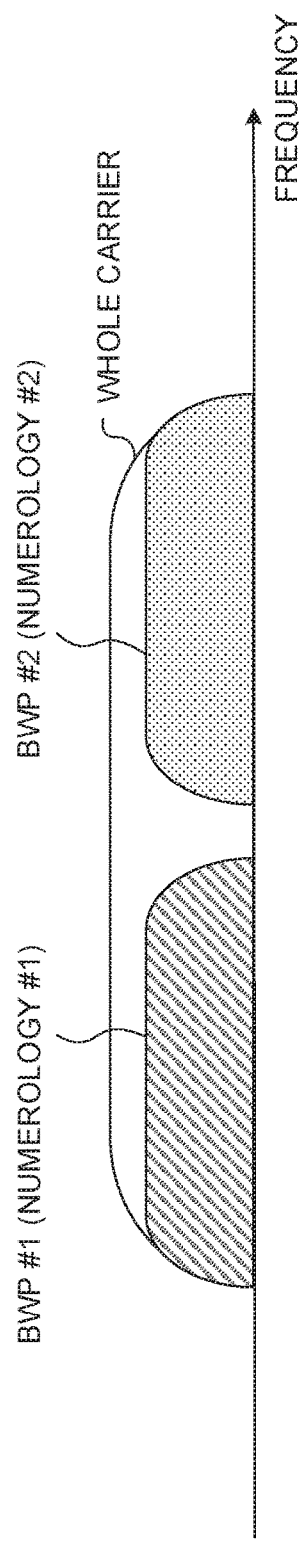

|  | No. of PRBs | RA type 0 | | RA type 1 | RA Type 0/1 switching |
|---|---|---|---|---|---|
|  |  | RBG size | Necessary No. of bits for RA field | Necessary No. of bits for RA field | Necessary No. of bits for RA field |
| BWP1 | 10 | 1 | 10 | 6 | 10+1 |
| BWP2 | 50 | 4 | 13 | 12 | 13+1 |
| BWP3 | 100 | 8 | 13 | 14 | 14+1 |

FIG. 6

|  | No. of PRBs | RA type 0 | | RA type 1 | RA Type 0/1 switching |
|---|---|---|---|---|---|
|  |  | RBG size | Necessary No. of bits for RA field | Necessary No. of bits for RA field | Necessary No. of bits for RA field |
| BWP1 | 10 | 1 | 10 | 6 | 10+1 |
| BWP2 | 50 | 4 | 13 | 12 | 13+1 |
| BWP3 | 100 | 8 | 13 | 14 | 14+1 |

FIG. 9

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE (referred to as, for example, "LTE-A (LTE-Advanced)," "FRA (Future Radio Access)," "4G," "5G," "5G+ (plus)," "NR (New RAT)," "LTE Rel. 14," "LTE Rel, 15 (or later versions)," etc.) are also under study for the purpose of achieving furthermore, broadbandization and increased speed beyond LTE.

Furthermore, in existing LTE systems (for example, LTE Rel. 8 to 13), downlink (DL) and/or uplink (UL) communication are carried out by using subframes of 1 ms as scheduling units. For example, when normal cyclic prefix (NCP) is used, this subframe is comprised of fourteen symbols at a subcarrier spacing of 15 kHz. This subframe is also referred to as a "transmission time interval (TTI)" and so on.

Furthermore, a user terminal (UE (User Equipment)) controls the receipt of a DL data channel (also referred to as, for example, "PDSCH (Physical Downlink Shared CHannel)," "DL shared channel," etc.) based on downlink control information (DCI (also referred to as "DL assignment," etc.)) from a radio base station (for example, eNB (eNodeB)). Furthermore, a user terminal controls the transmission of a UL data channel (also referred to as, for example, "PUSCH (Physical Uplink Shared CHannel)," "UL shared channel," etc.) based on DCI (also referred to as "UL grant," etc.) from a radio base station.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, NR), research is underway to allow a user terminal to receive (detect) DCI by monitoring (blind-decoding) a control resource field (for example, a control resource set (also referred to as a "CORESET")), which is a candidate field for allocating a DL control channel (for example, PDCCH (Physical Downlink Control CHannel)).

Furthermore, envisaging future radio communication systems, study is underway to use one or more partial frequency bands (also referred to as "partial bands," "bandwidth parts (BWPs)," etc.) in a carrier (also referred to as, for example, a "component carrier (CC)," a "system band," etc.) for DL and/or UL communication (also referred to as "DL/UL communication"), There is a demand to improve the throughput of radio communication by using such partial frequency bands for DL/UL communication.

The present invention has been made in view of the above, and it is therefore an object of the present invention to provide a user terminal and a radio communication method that are capable of improving radio communication throughput by using partial frequency bands for DL/UL communication.

Solution to Problem

According to one aspect of the present invention, a user terminal has a receiving section that receives downlink control information by using a first partial frequency band (BWP) among a plurality of BWPs configured in a carrier, and a control section that identifies, via a resource allocation field (RA field) having a size that is configured (or selected) based on a given BWP among the plurality of BWPs, a resource of a second BWP, which is different from the first BWP, in the downlink control information.

Advantageous Effects of Invention

According to the present invention, the throughput of radio communication can be improved by using partial frequency bands for DL/UL communication.

BRIEF DESCRIPTION OF DRAWINGS

FIGS. 1A to 1C are diagrams to illustrate examples of BWP configuration scenarios;

FIG. 6 is a diagram to explain a method of determining a frequency-domain RA field according to the first example of the present embodiment;

FIG. 9 is a diagram to explain a method of determining a frequency-domain RA field according to the second example of the present embodiment;

DESCRIPTION OF EMBODIMENTS

Figure 2:
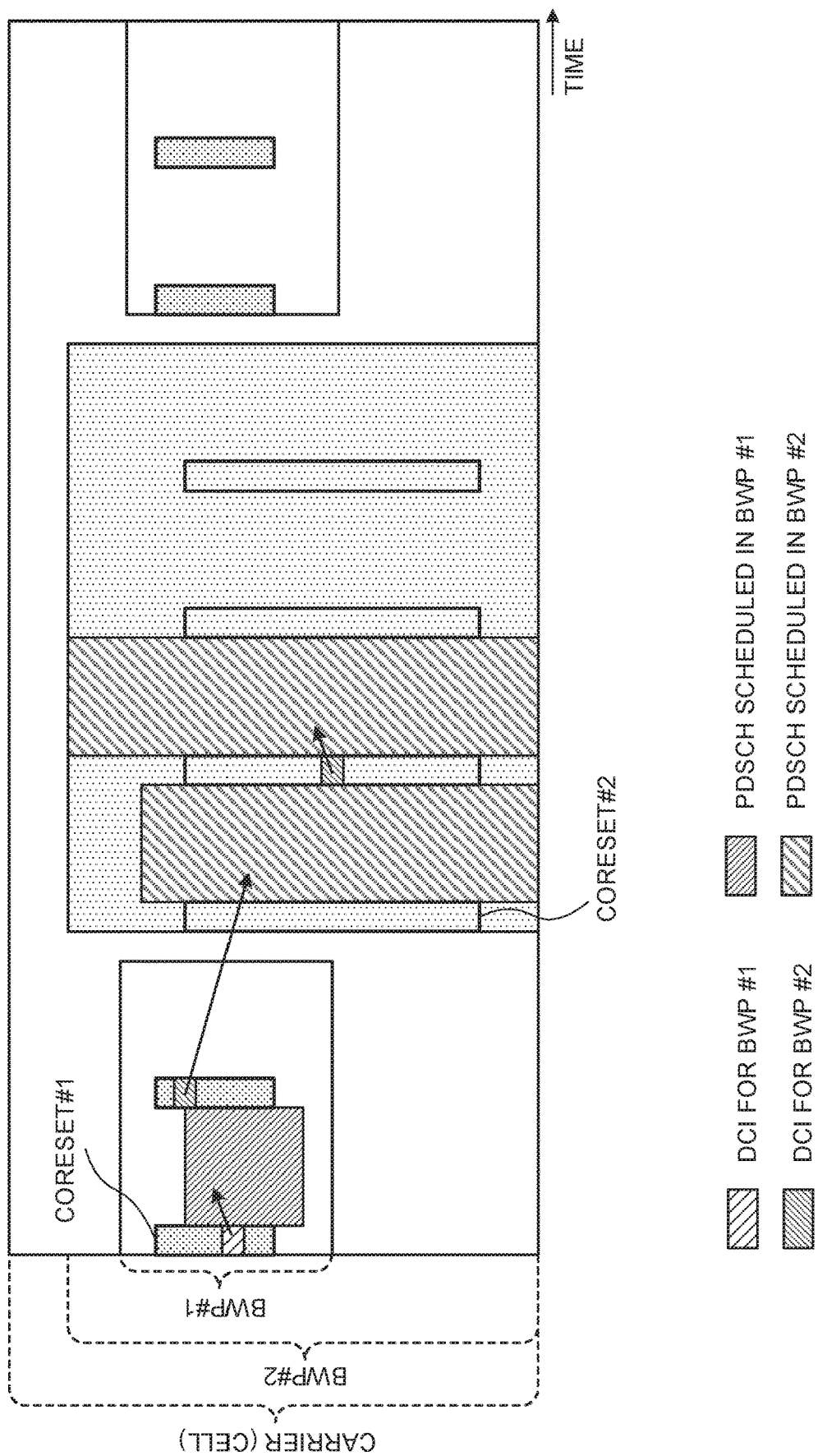
FIG. 2 is a diagram to illustrate an example of BWP activation/deactivation control.

Now, envisaging a future radio communication system (for example, NR, 5G or 5G+), research is underway to allocate a carrier (also referred to as "component carriers (CCs)," "cells," "system bands," etc.) having a wider bandwidth (for example, 100 to 800 MHz) than in existing LTE systems (for example, LTE Rel. 8 to 13).

Meanwhile, in this future radio communication system, user terminals that are capable of transmission and/or receipt (transmitting and/or receiving) in the entirety of the above carrier (and that are also referred to as "wideband (WB) UEs," "single-carrier WB UEs," etc.) and user terminals that are not capable of transmission and/or receipt in the entire carrier (and that are also referred to as "BW (BandWidth)-reduced UEs," etc.) might co-exist.

In this way, in a future radio communication system, a number of user terminals to support varying bandwidths (that is, various BW UE capabilities) might co-exist; and it naturally follows that study is underway to configure one or more partial frequency bands in a carrier, semi-statically. Each frequency band (for example, 50 MHz or 200 MHz) in this carrier is referred to as a "partial band," a "bandwidth part (BWP)," and so on.

FIG. 1 are diagrams to illustrate examples of BWP configuration scenarios. FIG. 1A illustrates a scenario in which a user terminal is configured with one BWP in one carrier (usage scenario #1). For example, in FIG. 1A, a 200-MHz BWP is configured within an 800-MHz carrier. The activation or deactivation of this BWP may be controlled.

Here, activating a BWP means providing a state in which this BWP can be used (or making a transition to a state in which this BWP can be used), and may be seen as, for example, activation or enablement of the BWP's configuration information (BWP configuration information). Also, deactivating a BWP means providing a state in which this BWP cannot be used (or making a transition to a state where the BWP cannot be used), and may be seen as, for example, deactivation or disablement of the BWP's configuration information. When a BWP is scheduled, this BWP is activated.

FIG. 1B illustrates a scenario in which a user terminal is configured with a number of BWPs in one carrier (usage scenario #2). As illustrated in FIG. 1B, these BWPs (for example, BWPs #1 and #2) may at least partially overlap. For example, in FIG. 1B, BWP #1 is a part of the frequency band of BWP #2.

Also, the activation or deactivation of at least one of these BWPs may be controlled. Also, the number of BWPs to be activated at a given (predetermined) time may be limited (for example, only one BWP may be active at a given time). For example, in FIG. 1B, only one of BWPs #1 and #2 is active at a given time.

For example, referring to FIG. 1B, BWP #1 may be activated when no data is transmitted and/or received, and BWP #2 may be activated when data is transmitted and/or received. To be more specific, when there is data to be transmitted and/or received, BWP #1 may be switched to BWP #2, and, when the transmission and/or the receipt of the data is finished, BWP #2 may be switched to BWP #1. In this way, the user terminal does not need to keep monitoring BWP #2, which has a wider bandwidth than BWP #1, so that power consumption can be reduced.

Note that, referring to FIGS. 1A and 1B, the network (which is, for example, a radio base station) needs not assume that the user terminal receives and/or transmits outside the active BWP. Note that, in the case of FIG. 1A, the user terminal, when supporting the whole carrier, is not prevented, in any way, from receiving and/or transmitting signals outside of the BWP.

FIG. 1C illustrates a scenario in which a number of BWPs are configured in different bands within one carrier (usage scenario #3). As illustrated in FIG. 1C, different numerologies may be applied to these BWPs. Here, a numerology may refer to at least one of the subcarrier spacing, the length of symbols, the length of slots (transmission time intervals (TTIs)), the length of cyclic prefix (CP), the number of symbols per slot, and so forth.

For example, in FIG. 1C, a user terminal having capabilities for transmission and/or receipt in the whole carrier may be configured with BWPs #1 and #2 with different numerologies. In FIG. 1C, at least one BWP configured for the user terminal is activated or deactivated, and one or more BWPs may be active at a given time.

Note that a BWP that is used in DL communication may be referred to as a "DL BWP (DL frequency band)," and a BWP that is used in UL communication may be referred to as a "UL BWP (UL frequency band)." A DL BWP and a UL BWP may have frequency bands that at least partially overlap, Hereinafter, a DL BWP and a UL BWP will be collectively referred to as a "BWP," unless a distinction needs to be made.

At least one of the DL BWPs configured for a user terminal (for example, a DL BWP included in the primary CC) may include a control resource field to serve as a candidate for allocating a DL control channel (DCI). This control resource field may be referred to as a "control resource set (CORESET)," a "control subband," a "search space set," a "search space resource set," a "control field," a "control subband," an "NR-PDCCH field," and so forth.

The user terminal monitors one or more search spaces in the CORESET, and detects the DCI for the user terminal. The search space may include a common search space (CSS), in which DCI (for example, group DCI or common DCI) that applies in common to one or more user terminals is allocated, and/or a user terminal (UE)-specific search space (USS), in which a user terminal-specific DCI (for example, a DL assignment and/or a UL grant) is allocated.

The user terminal may receive configuration information for the CORESET (CORESET configuration information) by using higher layer signaling (for example, RRC (Radio Resource Control) signaling, etc.). The CORESET configuration information may indicate, at least one of, each CORESET's frequency resource (for example, the number of RBs and/or the starting RB index, etc.), time resource (for example, the starting OFDM symbol index), time duration, REG (Resource Element Group) bundle size (REG size), transmission type (for example, interleaving is applied, interleaving is not applied, etc.), cycle (for example, the monitoring cycle per CORESET), and so forth.

Referring to FIG. 2, how to control the activation and/or deactivation of BWPs will be described (also referred to as "activation/deactivation," "switching," "determination,"

etc.). FIG. 2 is a diagram to illustrate an example of BWP activation/deactivation control. Note that, although FIG. 2 assumes the scenario illustrated in FIG. 1B, this BWP activation/deactivation control can be suitably applied to, for example, the scenarios illustrated in FIGS. 1A and 1C.

Furthermore, in FIG. 2, CORESET #1 is configured in BWP #1, and CORESET #2 is configured in BWP #2. One or more search spaces are provided in both CORESET #1 and CORESET #2. For example, in CORESET #1, DCI for BWP #1 and DCI for BWP #2 may be allocated in the same search space, or may be allocated in different search spaces separately.

Also, in FIG. 2, when BWP #1 is in the active state, the user terminal monitors (blind-decodes) the search space in CORESET #1 in a given cycle (for example, for every one or more slots, every one or more minislots, or every given number of symbols), and detects DCI for the user terminal.

The DCI may include information (BWP information) that indicates which BWP the DCI corresponds to. This BWP information may be, for example, a BWP index, or may be a given field value in DCI. Furthermore, this BWP index information may be included in DCI for downlink scheduling, may be included in DCI for uplink scheduling, or may be included in DCI of the common search space. The user terminal may select the BWP where a PDSCH or a PUSCH is scheduled by the DCI, based on the BWP information in the DCI.

When the user terminal detects DCI for BWP #1 in CORESET #1, the user terminal receives the PDSCH that is scheduled (allocated) in a given time and/or frequency resource (time/frequency resource) in BWP #1, based on the DCI for BWP #1.

Also, when the user terminal detects DCI for BWP #2 in CORESET #1, the user terminal deactivates BWP #1 and activates BWP #2. The user terminal receives the PDSCH that is scheduled in a given time/frequency resource in DL BWP #2, based on the DCI for BWP #2 detected in CORESET #1.

Note that, although, in FIG. 2, the DCI for BWP #1 and the DCI for BWP #2 are detected at different timings in CORESET #1, it is also possible to detect a number of DCIs for different BWPs at the same timing. For example, a number of search spaces that respectively correspond to a number of BWPs may be provided in CORESET #1, and a number of DCIs for different BWPs may be transmitted in these search spaces, respectively. The user terminal may monitor a number of search spaces in CORESET #1, and detect a number of DCIs for different BWPs at the same timing.

When BWP #2 is activated, the user terminal monitors (blind-decodes) the search space in CORESET #2 in a given cycle (for example, for every one or more slots, every one or more minislots, or every given number of symbols), and detects the DCI for BWP #2. The user terminal may receive the PDSCH that is scheduled in a given time/frequency resource in BWP #2, based on the DCI for BWP #2 detected in CORESET #2.

Note that, although FIG. 2 illustrates a case where a given time for switching between activation and deactivation is provided, but this given time may not be necessary.

As illustrated in FIG. 2, in the event activation of BWP #2 is triggered by the detection of DCI for BWP #2 in CORESET #1, it is possible to activate BWP #2 without explicit command information, so that it is possible to prevent an increase in overhead due to the control related to the activation.

Meanwhile, in FIG. 2, even if the user terminal fails (misses) detecting the DCI for BWP #2 in CORESET #1 (that is, the DCI for activating BWP #2), the radio base station cannot recognize this failure of detection. Consequently, there is a danger that, while the user terminal continues monitoring CORESET #1 for BWP #1, the radio base station misunderstands that the user terminal can use BWP #2 and transmits DCI that schedules a PDSCH in BWP #2, in CORESET #2.

In this case, if the radio base station cannot receive delivery acknowledgment information (also referred to as "HARQ-ACK," "ACK/NACK," "A/N," etc.) in response to the PDSCH within a given period, the radio base station may judge that the user terminal has failed to detect the DCI for activating BWP #2, and retransmit the DCI for activation, in CORESET #1. Alternatively, although not illustrated in FIG. 2, a CORESET that is common to BWP #1 and BWP #2 may be provided.

Also, when no data channel (for example, PDSCH and/or PUSCH) is scheduled for a given period in an activated BWP, this BWP may be deactivated. For example, in FIG. 2, no PDSCH is scheduled for a given period in DL BWP #2, and therefore the user terminal deactivates BWP #2 and activates BWP #1.

The user terminal may set up a timer, in an activated BWP, every time receipt of a data channel (for example, PDSCH and/or PUSCH) is complete, and may deactivate this BWP when the timer expires. As for the timer, a timer that is used for DL BWPs and UL BWPs in common (and that is also referred to as a "joint timer"), or individual timers may be used.

When a timer is used to deactivate BWP, it is not necessary to transmit explicit deactivation command information, so that the overhead associated with deactivation control can be reduced.

Now, the maximum number of BWPs that can be configured per carrier may be determined in advance. For example, in frequency division duplex (FDD (Frequency Division Duplex)) (paired spectrum), up to four DL BWPs and up to four UL BWPs may be configured per carrier, separately.

Meanwhile, in time division duplex (TDD (Time Division Duplex)) (unpaired spectrum), up to four pairs of DL BWPs and UL BWPs may be configured per carrier. Note that, in TDD, a DL BWP and a UL BWP to form a pair may have the same center frequency and have different bandwidths.

Although a single carrier has been illustrated above, a number of carriers (also referred to as "cells," "serving cells," etc.) may be integrated (for example, carrier aggregation (CA) and/or dual connectivity (DC)). At least one of these carriers may be configured with one or more BWPs, as described above.

When a number of cells are integrated in CA or DC, these cells may include a primary cell (PCell) and one or more secondary cells (SCells). The PCell corresponds to a single carrier (CC), and may include one or more BWPs. Also, each cell corresponds to a single carrier (CC), and may include one or more BWPs.

A common search space for random access procedures (RACH (Random Access CHannel) procedures) may be provided in each BWP of the PCell. Similarly, in each BWP of the PCell, a common search space for fallback, a common search space for paging, or a common search space for RMSI (Remaining Minimum System Information) may be provided.

In addition, a common search space for a PDCCH that applies in common to one or more user terminals (group-common PDCCH) may be provided in each BWP of one or more cells (PCells and/or SCells).

Also, a specific BWP may be set up for a user terminal in advance. For example, the BWP (initial active BWP), in which the PDSCH for communicating system information (for example, RMSI (Remaining Minimum System Information)) is scheduled, may be defined by the frequency location and the bandwidth of the CORESET where the DCI to schedule that PDSCH is allocated. Furthermore, the same numerology as RMSI may be applied to the initial active BWP.

Furthermore, a default BWP may be set up for the user terminal. The default BWP may be the initial active BWP described above, or may be configured by higher layer signaling (for example, RRC signaling).

Next, the control of activation/deactivation of BWPs in SCells will be described. Based on the results of inter-frequency measurements in a user terminal, a radio base station configures the user terminal with an SCell and one or more BWPs in the SCell.

Figure 3:
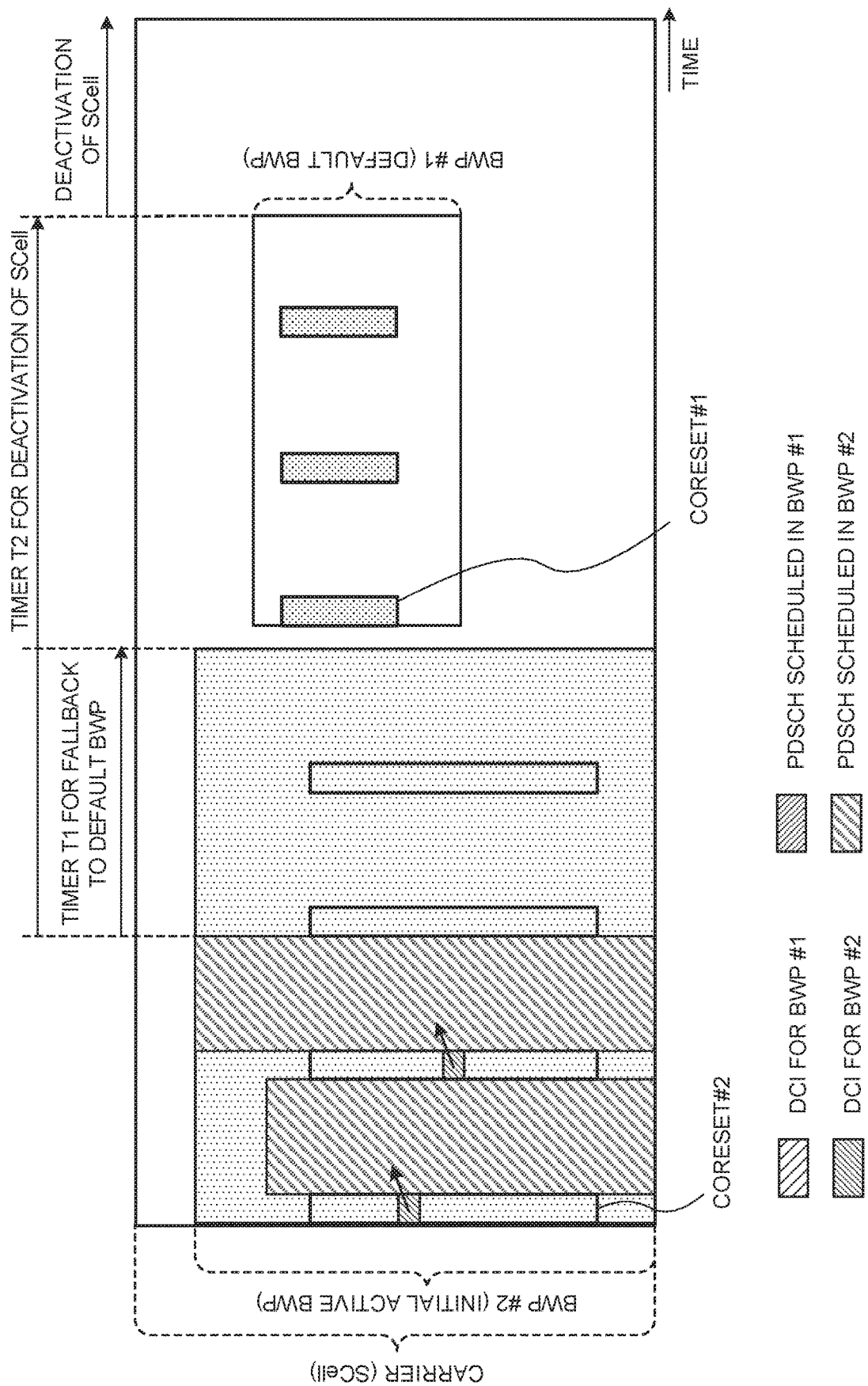
FIG. 3 is a diagram to illustrate an example of activation or deactivation control for one or more BWPs in an SCell.

FIG. 3 is a diagram to illustrate an example of activation or deactivation control for one or more BWPs in an SCell. In FIG. 3, the user terminal is configured with BWPs #1 and #2 in the SCell, but this is only an example and by no means limiting.

As illustrated in FIG. 3, in the SCell, a BWP with a wider bandwidth among a number of BWPs configured for the user terminal may be configured as an initial active BWP. This initial active BWP may be reported from the radio base station to the user terminal through higher layer signaling (for example, RRC signaling).

For example, in FIG. 3, BWP #2 having a wider bandwidth than BWP #1 may be configured for (reported to) the user terminal as the initial active BWP. Also, in FIG. 3, BWP #1, which is different from the initial active BWP, is configured for (reported to) the user terminal as a default BWP, but the same BWP may be configured as the initial active BWP and default BWP.

For example, in FIG. 3, the user terminal may start a timer T1 for switching (fallback) to the default BWP and a timer T2 for deactivating the SCell every time receipt of the PDSCH is complete in BWP #2. For example, the duration of the timer T2 is configured longer than the duration of the timer T1.

In FIG. 3, the user terminal monitors (blind-decodes) the search space in CORESET #2 of BWP #2 in a given cycle even after the timers T1 and T2 are started, but the timer T1 expires before DCI is detected. When the timer T1 expires, the user terminal deactivates BWP #2, which is the initial active BWP, and activates BWP #1, which is the default BWP.

The user terminal monitors (blind-decodes) the search space in CORESET #1 of activated BWP #1 in a given cycle, but the timer T2 expires before DCI is detected. When the timer T2 expires, all the BWPs are deactivated, and the SCell is deactivated.

As described above, when all the BWPs of the SCell are deactivated (that is, when the SCell is deactivated implicitly), it is possible to reduce the signaling overhead for deactivating the SCell.

As described above, it is assumed that future radio communications (for example, NR) will allow a number of different BWPs to be configured within a carrier (cell). Here, each BWP may have a bandwidth according to a specific numerology. In other words, the number of PRBs that can be used in a BWP depends on BWP configurations and active BWPs.

Meanwhile, the frequency domain resource allocation (RA) field is still under study. Therefore, research on how to implement BWP switching is also underway. For example, when Cross-carrier BWP scheduling is used (for example, when scheduling data of a second BWP, which is different from the first BWP, using downlink control information (DCI) for the first BWP), it is necessary to think about in what size (bit width) the frequency-domain RA field should be provided.

To think about this, it is necessary to take into account the fact that the number of PRBs varies between BWPs, as described above. This is because, for example, if the format of DCI is defined for each of a number of BWPs, the payload of DCI varies per BWP.

In view of the above, the present inventors have arrived at a method for fixing the bit size (bitwidth) of the frequency-domain RA field and making the payload of DCI uniform even when BWPs are scheduled differently than activated BWPs.

Now, embodiments of the present invention will be described below in detail with reference to the accompanying drawings. Note that, although three BWPs will be configured in the examples described below, the number of BWPs to configure is by no means limited to this.

First Example

Figure 4:
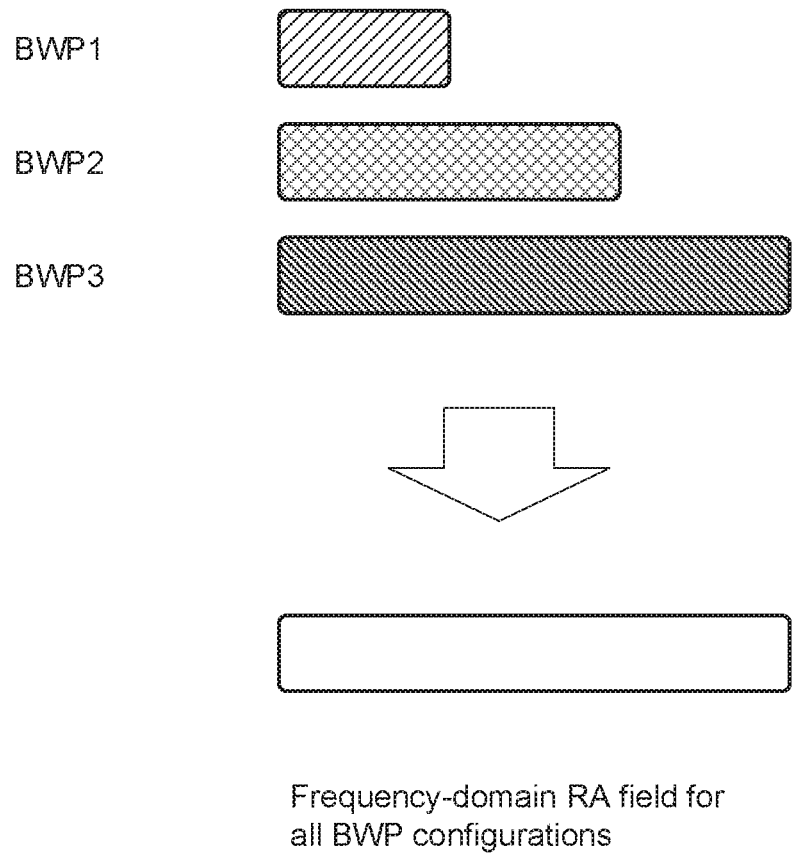
FIG. 4 is a diagram to explain a method of determining a frequency-domain RA field according to a first example of the present embodiment.
Figure 5:
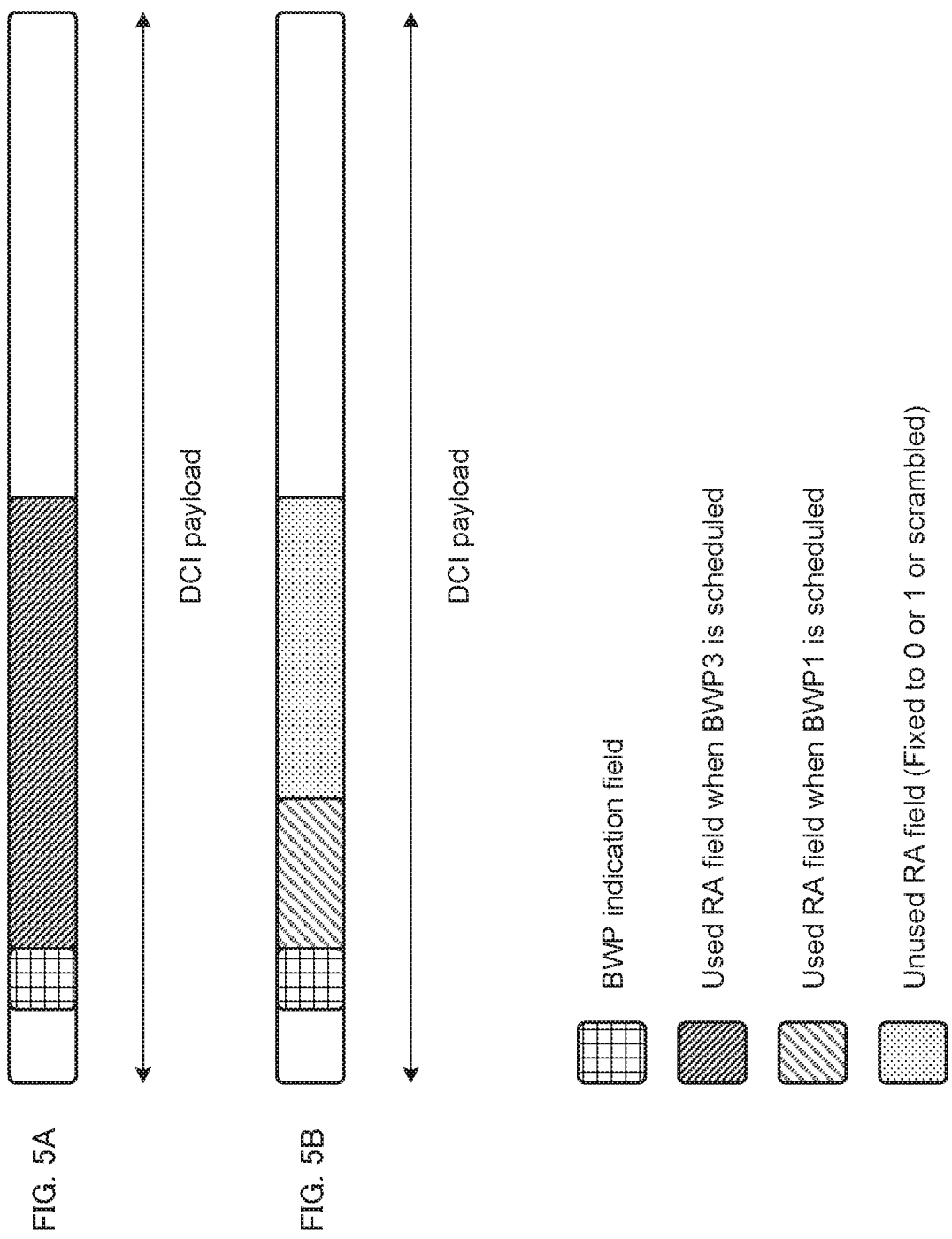
FIGS. 5A and 5B are diagrams to explain the operation of receiving downlink control information via a determined frequency-domain RA field, according to the first example of the present embodiment.

A first example of the present invention will be described below with reference to FIG. 4 to FIG. 6. First, a user terminal determines the size of a frequency-domain RA field, in order to define a common DCI format that is used regardless of which BWP's data is scheduled. To be more specific, the user terminal sets the above size to the maximum value for the number of required bits, in all the BWP configurations in the downlink.

In determining the size, first, the user terminal calculates the size (bitwidth) that is required of the frequency-domain RA field in each BWP. Although elements such as resource allocation type, BWP bandwidth, RB group (RBG) size and so forth are included in BWP configurations, the size required for the frequency-domain RA field of each BWP is calculated by taking into account all of these elements (see FIG. 4). In FIG. 4, the sizes of three BWPs 1 to 3 are calculated.

Next, the user terminal compares the calculated sizes and determines the size of the frequency-domain RA field. To be more specific, the largest size among all of calculated sizes is determined as the size of the frequency-domain RA field. In FIG. 4, the size of BWP 3 is the largest size among BWPs 1 to 3, and determined as the size of the frequency-domain RA field.

Next, the process in the event scheduling is performed based on DCI that is defined in the above-determined size of the frequency-domain RA field will be described.

DCI includes a BWP indication field. The user terminal can determine which BWP's scheduling is indicated, based on the information in this field. Also, based on the information of the frequency-domain RA field, the user terminal can determine in which RBs (multiple RBs) the data is scheduled.

If the number of bits (the number of bits required) of the frequency-domain RA field of the scheduled BWP is smaller than the size determined above, there will be unused bits in the frequency-domain RA field. In this case, a given number of upper bits (MSB) or lower bits (LSB) may be configured to a given bit (0 or 1). Alternatively, the unused bits may be fixed using given scrambling. For example, these unused bits may be used as redundant bits, to check the validity of the bits that are used.

FIG. 5A illustrates the configuration of DCI in the event BWP 3 is indicated in the BWP indication field. Since the size of BWP 3 is the largest size and determined as the size of the frequency-domain RA field, BWP 3 is scheduled by using the whole of the frequency-domain RA field.

FIG. 5B illustrates the configuration of DCI in the event BWP 1 is indicated in the BWP indication field. The number of bits required of the frequency-domain RA field of BWP 1 is smaller than the number of bits in BWP 3, and therefore there will be unused bits in the frequency-domain RA field.

When a BWP that is different from the BWP that has been activated is indicated in the BWP indication field (cross-BWP scheduling), the user terminal activates the BWP that is subject to scheduling, and deactivates the BWP that has been activated.

Next, specific examples of the numerical values of the size of the frequency-domain RA field according to the first example will be described using a table. In the table illustrated in FIG. 6, resource allocation (RA) types are also taken into account.

RA type 0 illustrates bitmap formats per resource block group (RBG), and RA type 1 indicates formats to specify the starting and ending values. Also, RA type 0/1 switching to switch between these RA types 0 and 1 dynamically is also considered.

For example, in RA type 0, the number of bits necessary for the frequency-domain RA field is ten bits in BWP 1, thirteen bits in BWP 2, and thirteen bits in BWP 3. Therefore, in RA type 0, the maximum necessary number bits in the frequency-domain RA field is thirteen bits.

For example, in RA type 1, the number of bits necessary for the frequency-domain RA field is six bits in BWP 1, twelve bits in BWP 2, and fourteen bits in BWP 3. Therefore, in RA type 1, the maximum necessary number bits in the frequency-domain RA field is fourteen bits.

In RA type 0/1 switching, the numbers of bits necessary for the frequency-domain RA field is determined by adding one bit to the larger one of RA type 0 and RA type 1 for an indication of which type is specified. To be more specific, BWP 1 has eleven bits of ten bits+one bit, BWP 2 has fourteen bits of thirteen bits+one bit, and BWP 3 has fifteen bits of fourteen bits+one bit. Therefore, in RA type 0/1 switching, the maximum necessary number bits in the frequency-domain RA field is fifteen bits. Note that the one bit for indicating the RA type may not be added to the number of bits necessary for the frequency-domain RA field, and it is also possible to take one bit from the number of bits necessary for the frequency-domain RA field calculated, and use this one bit as a type-indication field. In this case, the DCI overhead can be reduced by one bit.

According to the first example described above, even when a BWP that is different from an activated BWP is to be scheduled, it is possible to fix the bit size (bitwidth) of the frequency-domain RA field, and make the payload of DCI uniform. The user terminal can monitor downlink control information based on a single DCI format. Consequently, the processing load is reduced compared to monitoring a number of DCI formats, so that the power consumption can be reduced.

Note that activating a number of BWPs in downlink communication is also under study. According to the first example described above, a common DCI format can be used for a number of activated BWPs. Consequently, even when a number of BWPs are activated, the user terminal can monitor downlink control information based on a single DCI format. As a result, the processing load and the power consumption can be suppressed as described above.

Second Example

A second example of the present invention will be described below with reference to FIG. 7 to FIG. 9. First, unlike the above first example, the user terminal determines (adopts) the frequency-domain RA field size based on the BWP in which DCI is received. In the event one BWP is activated in downlink communication, the BWP in which DCI is received refers to this activated BWP.

First, the user terminal determines the size of the frequency-domain RA field based on the BWP in which DCI is received. In determining the size, the user terminal calculates the size (bitwidth) that is required of the frequency-domain RA field in each BWP. Although elements such as resource allocation type, BWP bandwidth and so forth are included in BWP configurations, the size required for the frequency-domain RA field of each BWP is calculated by taking into account all of these elements (see FIG.

Figure 7:
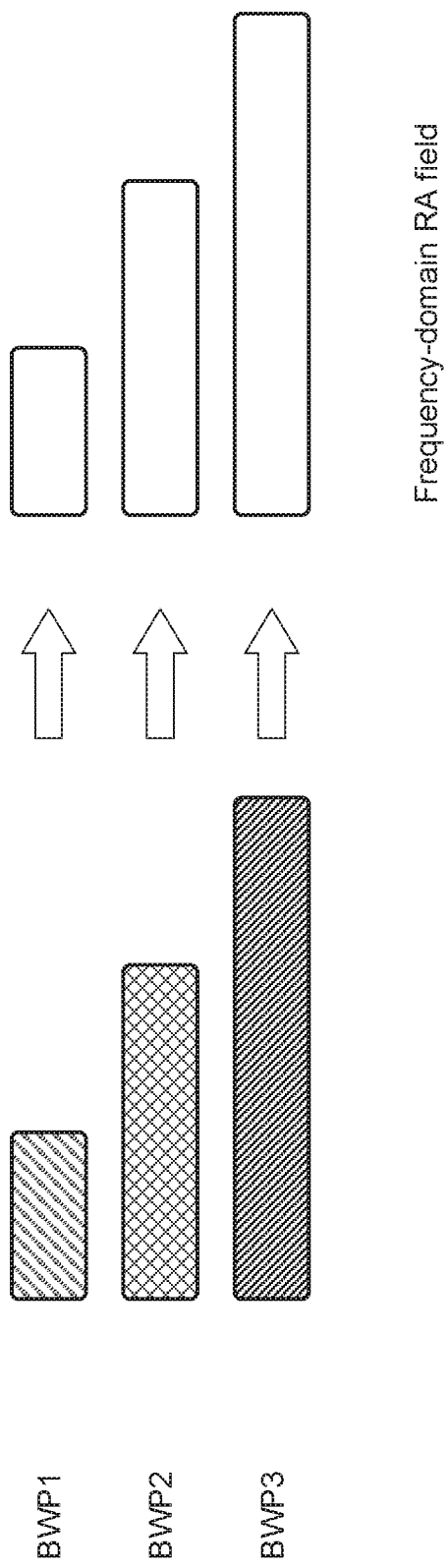
FIG. 7 is a diagram to explain a method of determining a frequency-domain RA field according to a second example of the present embodiment.
Figure 8:
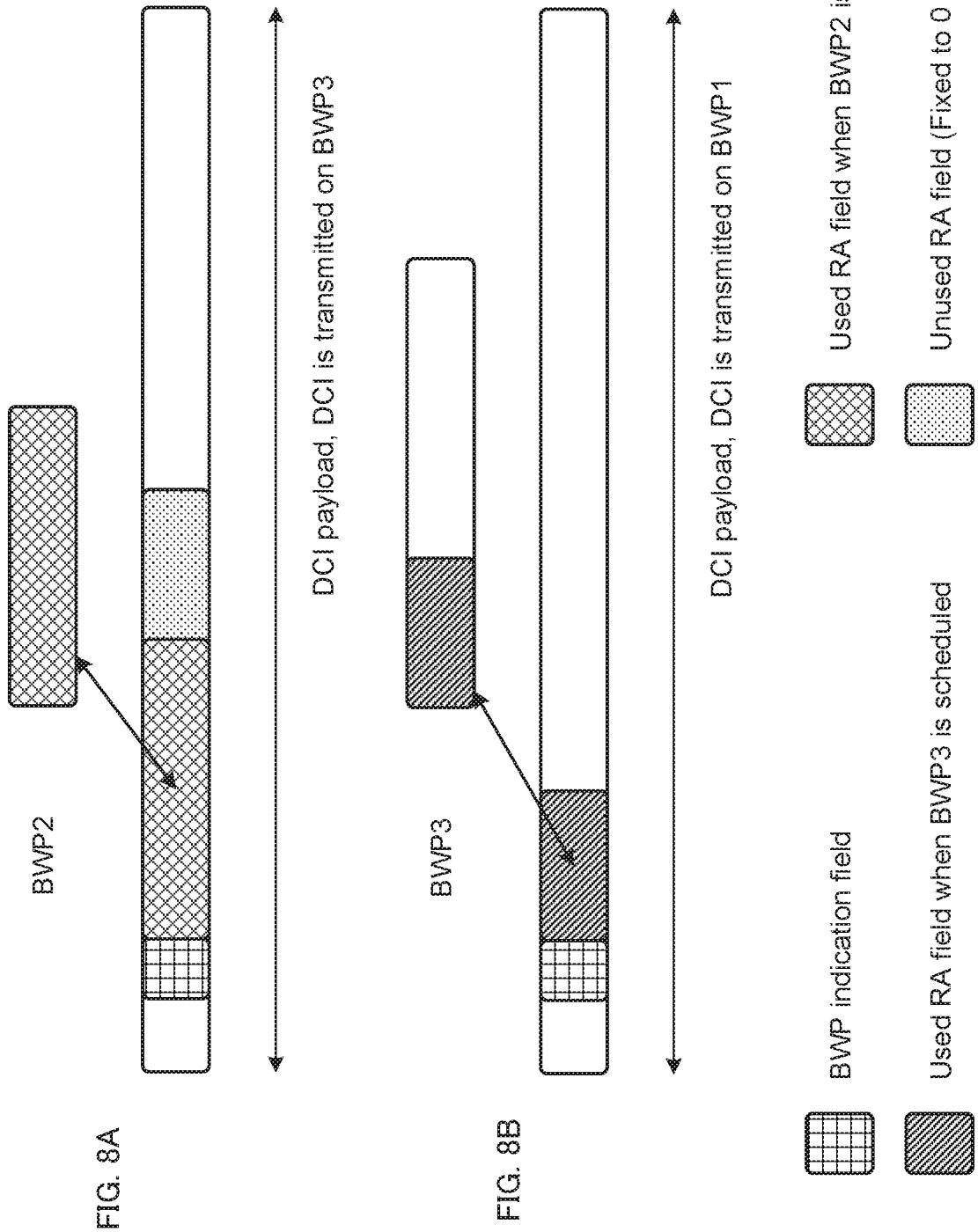
FIGS. 8A and 8B are diagrams to explain the operation of receiving downlink control information via a determined frequency-domain RA field, according to the second example of the present embodiment.

In FIG. 7, the sizes of three BWPs 1 to 3 are calculated. Also, different sizes are calculated for all of BWPs 1 to 3. When BWP 1 is the BWP in which DCI is received, the user terminal specifies the resource scheduled in the size of the frequency-domain RA field calculated based on BWP 1. Also, when BWP 2 is the BWP-receiving DCI, the user terminal specifies the resource scheduled in the size of the frequency-domain RA field calculated based on BWP 2, and, when BWP 3 is the BWP-receiving DCI, the user terminal likewise specifies the resource calculated in a size based on BWP 3.

Therefore, case might occur in which different BWPs are scheduled (BWPs where the required frequency-domain RA field size is different from the DCI format size that is employed) in the frequency-domain RA field size employed in the BWP-receiving DCI. Next, the process in the event scheduling is performed based on DCI that is defined in the frequency-domain RA field size to match the DCI-receiving BWP will be described.

Similar to the first example described above, in the second example, DCI includes a BWP indication field. The user terminal can determine which BWP's scheduling is indicated, based on the information in this field. Also, based on the information of the frequency-domain RA field, the user terminal can determine in which RBs (multiple RBs) the data is scheduled.

If the number of bits (the number of bits required) of the frequency-domain RA field of the scheduled BWP is smaller than the determined size (the frequency-domain RA field size of the BWP in which DCI is received), there will be unused bits in the frequency-domain RA field. In this case, a given number of upper bits (MSB) or lower bits (LSB) may be configured to a given bit (0 or 1). Alternatively, the unused bits may be fixed using given scrambling. For example, these unused bits may be used as redundant bits, to check the validity of the bits that are used.

FIG. 8A illustrates a configuration of DCI in the event the DCI is received in BWP 3 and BWP 2 is indicated in the BWP indication field. Since the size of BWP 3 is the largest size and determined as the size of the frequency-domain RA field, all of the information in the frequency-domain RA field required for BWP 2 can be included in the DCI. That is, all the scheduling of BWP 2 can be indicated in the frequency-domain RA field received.

Meanwhile, a case may be possible here in which the number of bits (number of required bits) in the frequency-domain RA field of a scheduled BWP is larger than the determined size (the frequency-domain RA field size of the BWP-receiving DCI).

FIG. 8B illustrates a configuration of DCI in the event the DCI is received in BWP 1 and BWP 3 is indicated in the BWP indication field. The size of the frequency-domain RA field based on BWP 1 is smaller than the frequency-domain RA field based on BWP 3 (FIG. 7), By this means, only part of the information of the frequency-domain RA field required for BWP 3 is included in the DCI. In the frequency-domain RA field required for BWP 3, the information that is not included in the DCI may be configured to a given bit (0 or 1). For example, when 0 is configured, part of the scheduling of BWP 3 can be indicated in the frequency-domain RA field received.

When a BWP that is different from the BWP that has been activated is indicated in the BWP indication field (cross-BWP scheduling), the user terminal activates the BWP that is subject to scheduling, and deactivates the BWP that has been activated.

Next, specific examples of the numerical values of the size of the frequency-domain RA field according to the second example will be described using a table. In the table illustrated in FIG. 9, resource allocation (RA) types are also taken into account. Note that the table of FIG. 9 is simply an example, and the specific numerical values used are the same as those of the first example (FIG. 6).

For example, when DCI is transmitted and/or received in BWP 1, in RA type 0, the size of the frequency-domain RA field is ten bits. This is six bits in RA type 1, and ten bits+one bit in RA type 0/1 switching.

For example, when DCI is transmitted and/or received in BWP 2, in RA type 0, the size of the frequency-domain RA field is thirteen bits. This is twelve bits in RA type 1, and thirteen bits+one bit in RA type 0/1 switching.

For example, when DCI is transmitted and/or received in BWP 3, in RA type 0, the size of the frequency-domain RA field is thirteen bits. This is fourteen bits in RA type 1, and fourteen bits+one bit in RA type 0/1 switching.

For example, assume a case in which the PDSCH for RA type 0 of BWP 2 is scheduled using DCI for RA type 0 of BWP 1. The size of the frequency-domain RA field of the DCI is ten bits, and the size required for scheduling is thirteen bits. Therefore, the size of the frequency-domain RA field is three bits short. In this case, the user terminal specifies ten bits of scheduled resources, and fixes the missing (lacking) three bits to 0 or 1, without using these bits for identifying resources.

In this case, the resources to be scheduled by part of the information may be configured to shift based on offsets. By this means, the resources to be scheduled by part of the information are not fixed, and scheduling can be performed flexibly with limited information. The offsets may be configured by higher layer signaling such as RRC signaling, or may be determined implicitly based on C-RNTI, UE-ID, PDCCH resource information (for example, CCE index), and so forth.

Furthermore, the RBG size may be configured to change. For example, in RA type 0 of BWP 1, the RBG size is configured to 1, but by configuring this to 8, scheduling to compensate for the missing bits becomes possible. The RBG size may be configured by higher layer signaling such as RRC signaling, or may be determined implicitly based on C-RNTI, UE-ID, PDCCH resource information (for example, CCE index) and so forth.

Also, assume a case in which the PDSCH for RA type 1 of BWP 2 is scheduled using DCI for RA type 0 of BWP 3. The size of the frequency-domain RA field of the DCI is thirteen bits, and the size required for scheduling is six bits. Therefore, the size required for scheduling BWP 1 is fulfilled, but seven bits are left.

In the seven bits that are not used for scheduling, a given number of upper bits (MSB) or lower bits (LSB) may be configured to a given bit (0 or 1). Alternatively, the unused bits may be fixed using given scrambling. For example, these unused bits may be used as redundant bits, to check the validity of the bits that are used.

According to the second example described above, even when a BWP that is different from an activated BWP is to be scheduled, the size (bitwidth) of the frequency-domain RA field is fixed to the frequency field RA field size of a BWP in which DCI is received. Therefore, the DCI payload can be made uniform until the BWP is deactivated. The user terminal can monitor downlink control information based on a single DCI format. Consequently, the processing load is reduced compared to monitoring a number of DCI formats, so that the power consumption can be reduced.

(Radio Communication System)

Now, the structure of a radio communication system according to an embodiment of the present invention will be described below. In this radio communication system, the radio communication methods according to the herein-contained examples will be employed. Note that the radio communication methods according to the herein-contained examples may be applied individually, or may be combined and applied.

Figure 10:
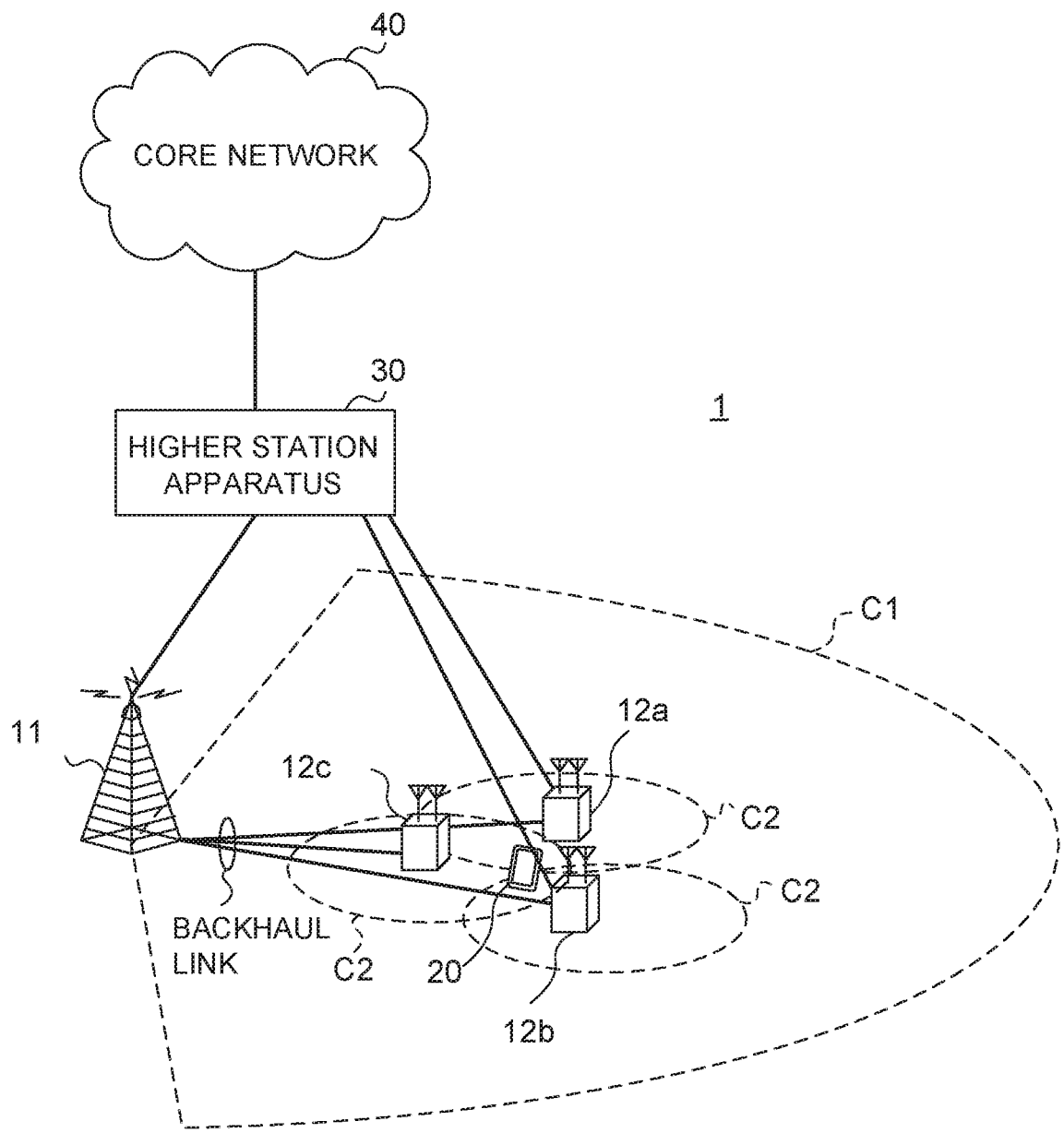
FIG. 10 is a diagram to illustrate an exemplary schematic structure of a radio communication system according to the present embodiment.

FIG. 10 is a diagram to illustrate an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 illustrated in FIG. 10 includes a radio base station 11 that forms a macro cell C1, and radio base stations 12a to 12c that are allocated within the macro cell C1 and that form small cells C2, which are narrower than the macro cell C1 Also, user terminals 20 are placed in the macro cell C1 and in each small cell C2. A structure in which different numerologies are applied between cells may be adopted here. Note that, a numerology may refer to at least one of subcarrier spacing, the length of a symbol, the length of a cyclic prefix (CP), the number of symbols per transmission time interval (TTI), and the time length of a TTI. Also, slots may be defined as units of time that depend on what numerology a user terminal uses. The number of symbols per slot may be determined by subcarrier spacing.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can run CA or DC by using a number of cells (CCs) (for example, two or more CCs). Furthermore, the user terminals can use licensed-band CCs and unlicensed-band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)" and an "FDD carrier (frame configuration type 1)," respectively.

Also, in each cell (carrier), a slot having a relatively long time length (for example, 1 ms) (also referred to as a "TTI," a "normal TTI," a "long TTI," a "normal subframe," a "long subframe," "subframe" and so forth) and/or a slot having a relatively short time length (also referred to as a "mini-slot," a "short TTI," a "short subframe," and so forth) may be used. Also, two or more time-length slots may be used in each cell.

Between the user terminals 20 and the radio base station 11, communication can be carried out using a carrier of a relatively low frequency band (for example, 2 GHz) and a narrow bandwidth (referred to as an "existing carrier," a "legacy carrier," etc.). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these. Furthermore, the user terminal 20 may be configured with one or more BWPs. BWP is comprised of at least part of the carrier.

The radio base station 11 and a radio base station 12 (or two radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting receiving point" and so on. Also, the radio base stations 12 are radio base stations each having a local coverage, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands that are each formed with one or more contiguous resource blocks, per terminal, and allowing a number of terminals to use mutually different bands. Note that the uplink and downlink radio access schemes are not limited to the combinations of these, and OFDMA may be used in UL. Also, SC-FDMA can be applied to a side link (SL) that is used in inter-terminal communication.

In the radio communication system 1, a DL data channel (also referred as a PDSCH (Physical Downlink Shared CHannel), a DL shared channel, and so on), which is used by each user terminal 20 on a shared basis, a broadcast channel (PBCH (Physical Broadcast CHannel)), L1/L2 control channels and so on are used as DL channels. DL data (at least one of user data, higher layer control information, SIBs (System Information Blocks) and so on) is communicated by the PDSCH. Also, the MIB (Master Information Block) is communicated by the PBCH.

The L1/L2 control channels include DL control channels (such as PDCCH (Physical Downlink Control CHannel), EPDCCH (Enhanced Physical Downlink Control CHannel), etc.), PCFICH (Physical Control Format Indicator CHannel), PHICH (Physical Hybrid-ARQ Indicator CHannel) and so on, Downlink control information (DCI), which includes PDSCH and/or PUSCH scheduling information and so on, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (also referred to as "A/N," "HARQ-ACK," "HARQ-ACK bit," "A/N codebook" and so on) can be communicated by using the PHICH.

UL channels that are used in the radio communication system 1 include a UL data channel that is shared by each user terminal 20 (also referred to as "PUSCH (Physical Uplink Shared CHannel)," "UL shared channel," etc.), a UL control channel (PUCCH (Physical Uplink Control CHannel)), a random access channel (PRACH (Physical Random Access CHannel)) and so on. UL data (user data and/or higher layer control information) is communicated by the PUSCH. Uplink control information (UCI), including at least one of PDSCH delivery acknowledgement information (A/N, HARQ-ACK, etc.), channel state information (CSI) and so on, is communicated by the PUSCH or the PUCCH, By means of the PRACH, random access preambles for establishing connections with cells are communicated.

(Radio Base Station)

Figure 11:
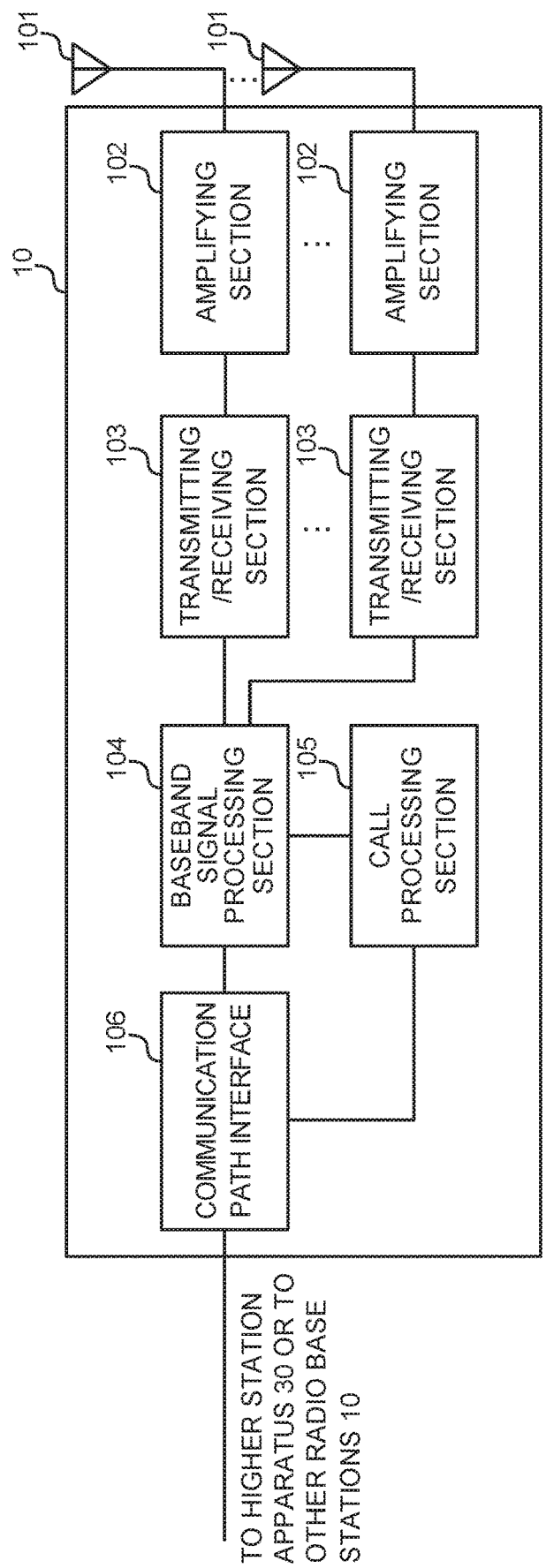
FIG. 11 is a diagram to illustrate an exemplary overall structure of a radio base station according to the present embodiment.

FIG. 11 is a diagram to illustrate an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided. The radio base station 10 may be "receiving apparatus" in UL and "transmitting apparatus" in DL.

User data to be transmitted from the radio base station 10 to a user terminal 20 on the downlink is input from the higher station apparatus 30, to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, rate matching, scrambling, an inverse fast Fourier transform (IFFT) process and a precoding process, and the result is forwarded to each transmitting/receiving section 103. Furthermore, downlink control signals are also subjected to transmission processes such as channel coding and/or an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 103 can be constituted by a transmitter/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104; UL data that is included in the UL signals that are input is subjected to a fast Fourier transform (FFT) process; an inverse discrete Fourier transform (IDFT) process, error correction decoding, a MAC retransmission control receiving process, and RLC layer and PDCP layer receiving processes, and the result is forwarded to the higher station apparatus 30 via the communication path interface 106. The call processing section 105 at least performs call processing such as setting up and releasing communication channels, manages the state of the radio base station 10 or manages the radio resources.

The communication path interface section 106 transmits and receives signals to and from the higher station apparatus 30 via a given interface. Also, the communication path interface 106 may transmit and receive signals (backhaul signaling) with neighboring radio base stations 10 via an inter-base station interface (which is, for example, optical fiber in compliance with the CPRI (Common Public Radio Interface), the X2 interface, etc.).

Furthermore, the transmitting/receiving sections 103 transmit DL signals (for example, at least one of a DL control signal (also referred to as a "DL control channel," "DCI," etc.), a DL data signal (also referred to as a "DL data channel," "DL data," etc.) and a reference signal). Also, the transmitting/receiving sections 103 receive UL signals (for example, at least one of a UL control signal (also referred to as a "UL control channel," "UCI," etc.), a UL data signal (also referred to as a "UL data channel," "UL data," etc.) and a reference signal).

Furthermore, the transmitting/receiving sections 103 may transmit higher layer control information (for example, control information by MAC CE and/or RRC signaling).

Also, the transmitting/receiving sections 103 may transmit DCI in the DCI formats defined in the first example or the second example described above.

Figure 12:
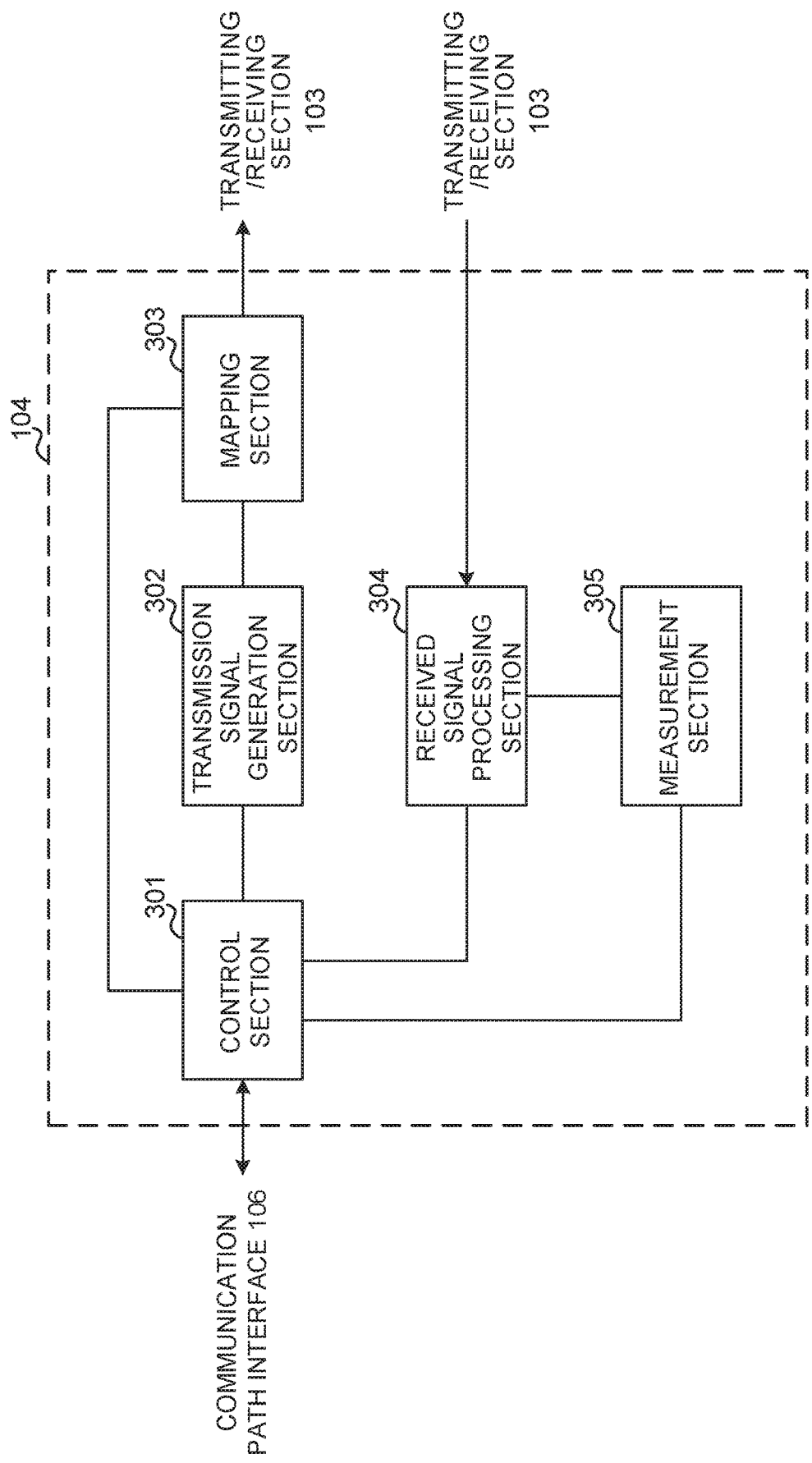
FIG. 12 is a diagram to illustrate an exemplary functional structure of a radio base station according to the present embodiment.

FIG. 12 is a diagram to illustrate an exemplary functional structure of a radio base station according to the present embodiment. Note that, although FIG. 12 primarily illustrates functional blocks that pertain to characteristic parts of the present embodiment, the radio base station 10 has other functional blocks that are necessary for radio communication as well. As illustrated in FIG. 12, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, at least one of the generation of DL signals in the transmission signal generation section 302, the mapping of DL signals in the mapping section 303, the receiving process (for example, demodulation) of UL signals in the received signal processing section 304, and the measurements in the measurement section 305. Also, the control section 301 may control the scheduling of data channels (including DL data channels and/or UL data channels).

The control section 301 may control the communication direction of each symbol in the time unit (for example, a slot) that serves as the DL data channel scheduling unit. To be more specific, the control section 301 may control the generation and/or transmission of slot format-related information (SFI), which indicates the DL symbols and/or UL symbols in a slot.

Also, the control section 301 may exert control so that one or more BWPs are configured and radio communication with the user terminal 20 is carried out by using the configured BWPs, using TDD (Time Division Duplexing) or FDD (Frequency Division Duplexing).

Furthermore, the control section 301 may schedule BWPs by using the DCI formats defined in the first example or the second example described above.

The control section 391 can be constituted by a controller, a control circuit or control apparatus that can be described based on general understanding of the technical field to which the present invention pertains.

The transmission signal generation section 302 may generate DL signals (including at least one of DL data (channel), DCI, DL reference signals, control information to be sent in higher layer signaling) as commanded from the control section 301, and output these signals to the mapping section 303.

The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302, to given radio resources, based on commands from the control section 301, and outputs these to the transmitting/receiving sections 103. For example, the mapping section 303 maps reference signals to given radio resources in allocation patterns determined by the control section 301.

The mapping section 303 can be constituted by a mapper, a mapping circuit or mapping apparatus that can be described based on general understanding of the technical field to which the present invention pertains.

The received signal processing section 304 performs receiving processes (for example, at least one of demapping, demodulation and decoding) for the UL signals transmitted from the user terminal 20. Also, the received signal processing section 304 outputs the received signals and/or the signals after the receiving processes to the measurement section 305.

The received signal processing section 304 can be constituted by a signal processor, a signal processing circuit or signal processing apparatus that can be described based on general understanding of the technical field to which the present invention pertains. Also, the received signal processing section 304 can constitute the receiving section according to the present invention.

The measurement section 305 may measure UL channel quality based on, for example, the received power (for example, RSRP (Reference Signal Received Power)) and/or the received quality (for example, RSRQ (Reference Signal Received Quality)) of reference signals. The measurement results may be output to the control section 301.

(User Terminal)

Figure 13:
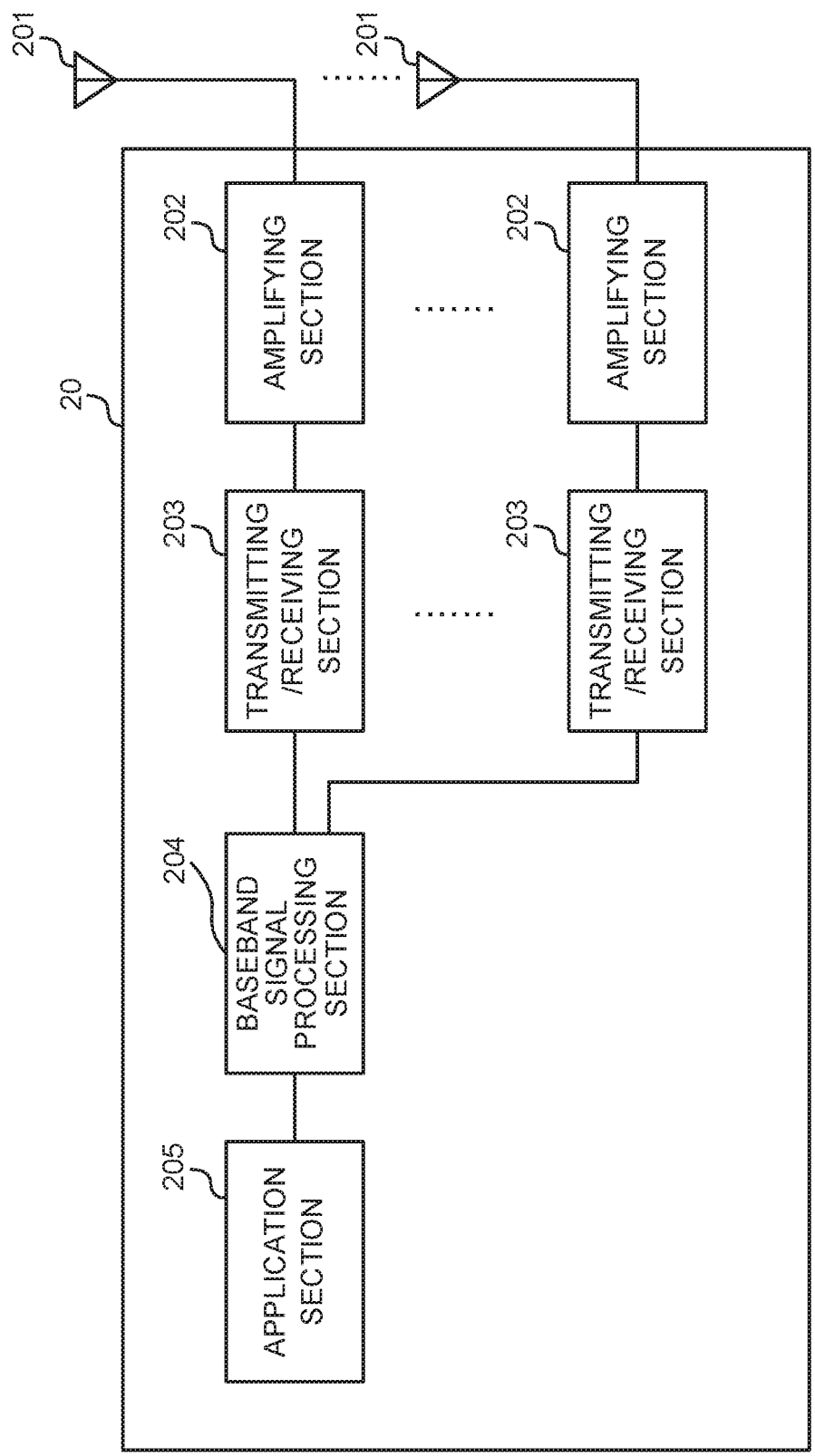
FIG. 13 is a diagram to illustrate an exemplary overall structure of a user terminal according to the present embodiment.

FIG. 13 is a diagram to illustrate an exemplary overall structure of a user terminal according to the present embodiment. A user terminal 20 has a plurality of transmitting/receiving antennas 201 for MIMO transmission, amplifying sections 202, transmitting/receiving sections 203, a baseband signal processing section 204, and an application section 205. The user terminal 20 may be "transmitting apparatus" in UL and "receiving apparatus" in DL.

Radio frequency signals that are received in the multiple transmitting/receiving antennas 201 are amplified in the amplifying sections 202. The transmitting/receiving sections 203 each receive the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, at least one of an FFT process, error correction decoding, a retransmission control receiving process and so on. The DL data is forwarded to the application section 205. The application section 205 performs processes related to higher layers above the physical layer and the MAC layer, and so on.

Meanwhile, UL data is input from the application section 205 to the baseband signal processing section 204. The baseband signal processing section 204 performs at least one of a retransmission control process (for example, an HARQ transmission process), channel coding, rate matching, puncturing, a discrete Fourier transform (DFT) process, an IFFT process and so on, and the result is forwarded to each transmitting/receiving section 203. UCI (which may be, for example, at least one of an A/N in response to a DL signal, channel state information (CSI), a scheduling request (SR) and the like) is also subjected to at least one of channel coding, rate matching, puncturing, a DFT process, an IFFT process and so on, and the result is forwarded to the transmitting/receiving sections 203.

Baseband signals that are output from the baseband signal processing section 204 are converted into a radio frequency band in the transmitting/receiving sections 203, and transmitted. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive DL signals (for example, at least one of a DL control signal (also referred to as a "DL control channel," "DCI," etc.), a DL data signal (also referred to as a "DL data channel," "DL data," etc.) and a reference signal). Also, the transmitting/receiving sections 203 transmit UL signals (for example, at least one of a UL control signal (also referred to as a "UL control channel," "UCI," etc.), a UL data signal (also referred to as a "UL data channel," "UL data," etc.) and a reference signal).

Furthermore, the transmitting/receiving sections 203 may receive higher layer control information (for example, control information by MAC CE and/or RRC signaling).

Furthermore, the transmitting/receiving sections 203 may transmit and receive signals and/or information based on TDD (Time Division multiple Duplexing), using a DL/UL frequency band pair (DL/UL BWP pair) formed with a UL frequency band and a DL frequency band configured in a carrier in the frequency direction.

Also, the transmitting/receiving sections 203 may receive DCI in the DCI formats defined in the first example or the second example described above.

A transmitting/receiving section 203 can be constituted by a transmitter/receiver, a transmitting/receiving circuit or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 14:
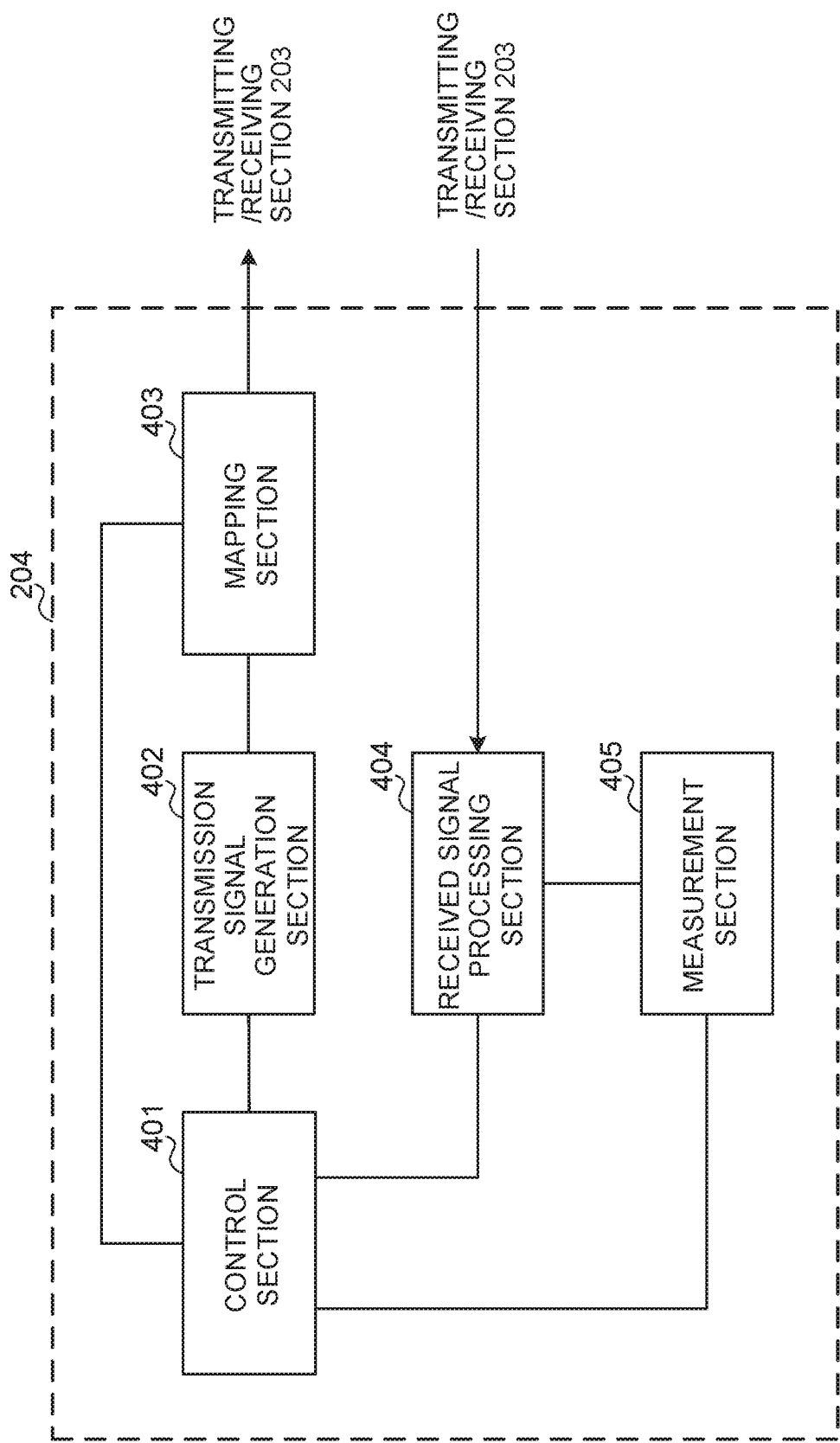
FIG. 14 is a diagram to illustrate an exemplary functional structure of a user terminal according to the present embodiment.

FIG. 14 is a diagram to illustrate an exemplary functional structure of a user terminal according to the present embodiment. Note that, although FIG. 14 primarily illustrates functional blocks that pertain to characteristic parts of the present embodiment, the user terminal 20 has other functional blocks that are necessary for radio communication as well. As illustrated in FIG. 14, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, at least one of generation of UL signals in the transmission signal generation section 402, mapping of UL signals in the mapping section 403, the receiving process of DL signals in the received signal processing section 404 and measurements in the measurement section 405.

Also, the control section 401 may exert control so that one or more BWPs are configured and radio communication with the user terminal 10 is carried out by using the configured BWPs, using TDD (Time Division Duplexing) or FDD (Frequency Division Duplexing).

The control section 401 may identify the resources of scheduled BWPs by using the DCI formats defined in the first example or the second example described above.

The transmitting/receiving sections 203 receive downlink control information by using the first BWP among a plurality of partial frequency bands (BWPs) configured in a carrier, and the control section 401 may determine the resource of a second BWP, which is different from the first BWP, via a resource allocation field (RA field) having a size that is configured (selected) based on a given BWP among the plurality of BWPs, in the downlink control information.

The given BWP may be a BWP having the widest bandwidth among the plurality of BWPs. The given (predetermined) BWP may be the first BWP.

When receiving the downlink control information, the control section 401 may activate the second BWP and deactivate the first BWP.

The control section 401 may monitor the same size downlink control information, regardless of whether the activated BWP is the first BWP or the second BWP.

The control section 401 can be constituted by a controller, a control circuit or control apparatus that can be described based on general understanding of the technical field to which the present invention pertains.

The transmission signal generation section 402 generates retransmission control information for UL signals and DL signals as commanded from the control section 401 (including performing encoding, rate matching, puncturing, modulation and/or other processes), and outputs this to the mapping section 403. The transmission signal generation section 402 can be constituted by a signal generator, a signal generating circuit, or signal generation apparatus that can be described based on general understanding of the technical field to which the present invention pertains.

The mapping section 403 can be constituted by a mapper, a mapping circuit or mapping apparatus that can be described based on general understanding of the technical field to which the present invention pertains.

The received signal processing section 404 performs receiving processes of DL signals (including, for example, at least one of demapping, demodulation and decoding). For example, the received signal processing section 404 may demodulate a DL data channel by using a reference signal provided in an allocation pattern determined by the control section 401.

Also, the received signal processing section 404 may output the received signals and/or the signal after the receiving process to the control section 401 and/or the measurement section 405. The received signal processing section 404 outputs, for example, higher layer control information to be sent in higher layer signaling, L1/L2 control information (for example, UL grant and/or DL assignment) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiment illustrate blocks in functional units. These functional blocks (components) may be implemented in arbitrary combinations of hardware and/or software. Also, means for implementing each functional block is not particularly limited. That is, each functional block may be realized by one piece of apparatus that is physically and/or logically aggregated, or may be realized by directly and/or indirectly connecting two or more physically and/or logically-separate pieces of apparatus (by using cables and/or radio, for example) and using these multiple pieces of apparatus.

Figure 15:
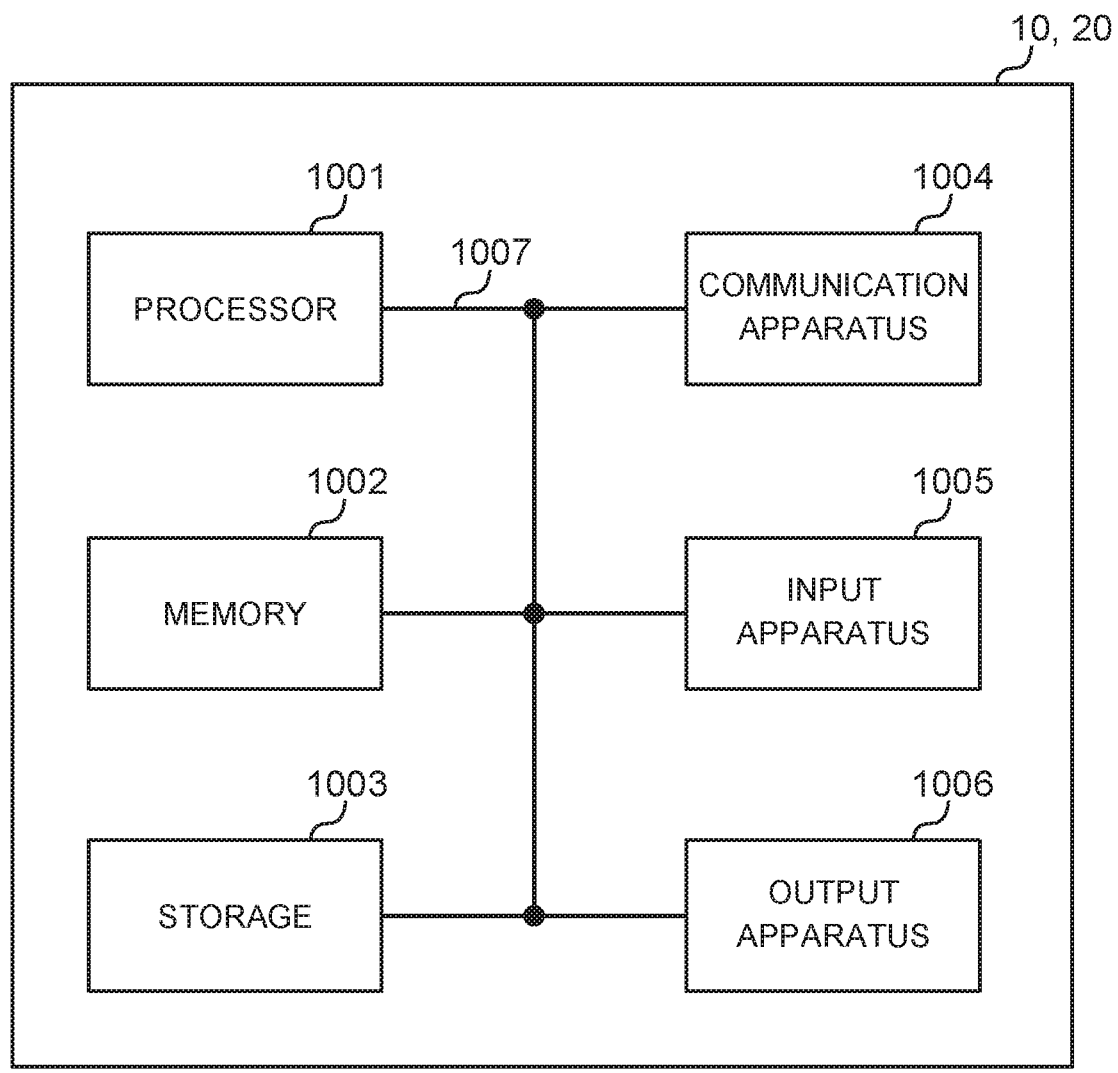
FIG. 15 is a diagram to illustrate an exemplary hardware structure of a radio base station and a user terminal according to the present embodiment.

For example, the radio base station, the user terminal and so on according to the present embodiment may function as a computer that executes the processes of the radio communication method of the present invention. FIG. 15 is a diagram to illustrate an exemplary hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006, a bus 1007 and so on.

Note that, in the following description, the term "apparatus" may be interpreted as "circuit," "device," "unit" and so on. Note that, the hardware structure of a radio base station 10 and a user terminal 20 may be designed to include one or more of each apparatus illustrated in the drawings, or may be designed not to include part of the apparatus.

For example, although only one processor 1001 is illustrated, a plurality of processors may be provided. Furthermore, processes may be implemented with one processor, or processes may be implemented simultaneously or in sequence, or by using different techniques, on one or more processors. Note that the processor 1001 may be implemented with one or more chips.

Each function of the radio base station 10 and the user terminal 20 is implemented by, for example, loading given software (programs) on hardware such as the processor 1001 and the memory 1002, and allowing the processor 1001 to do calculations, and control at least one of the communication by the communication apparatus 1004, the reading and writing of data in the memory 1002 and the storage 1003 and so on.

The processor 1001 may control the whole computer by, for example, running an operating system. The processor 1001 may be constituted by a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules and so on for implementing the radio communication method according to an embodiment of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) or the like), a digital versatile disc, a Blu-ray (registered trademark) disk, etc.), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using cable and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer and so on, in order to implement, for example, frequency division duplexing (FDD) and/or time division duplexing (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from outside (for example, a keyboard, a mouse, a microphone, a switch, a button, a sensor and so on). The output apparatus 1006 is an output device for allowing sending output to outside (for example, a display, a speaker, an LED (Light Emitting Diode) lamp and so on). Note that the input apparatus 1005 and the output apparatus 1006 may be provided in an integrated structure (for example, a touch panel).

Also, each device illustrated in FIG. 15 is connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by these pieces of hardware. For example, the processor 1001 may be implemented with at least one of these pieces of hardware.

(Variations)

Note that, the terminology used in this specification and the terminology that is needed to understand this specification may be replaced by other terms that communicate the same or similar meanings. For example, a "channel" and/or a "symbol" may be replaced by a "signal" (or "signaling"). Also, a "signal" may be a "message." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. One or more periods (frames) that constitute a radio frame may be each referred to as a "subframe." Furthermore, a subframe may be comprised of one or more slots in the time domain. A subframe may be a fixed time duration (for example, 1 ms), which does not depend on numerology.

A slot may be comprised of one or more symbols in the time domain (OFDM (Orthogonal Frequency Division Multiplexing) symbols, SC-FDMA (Single Carrier Frequency Division Multiple Access) symbols and so on). Also, a slot may be a time unit based on numerology. Also, a slot may include a plurality of mini-slots. Each mini-slot may be comprised of one or more symbols in the time domain.

A radio frame, a subframe, a slot, a mini-slot, and a symbol all refer to a unit of time in signal communication. A radio frame, a subframe, a slot, a mini-slot, and a symbol may be each called by other applicable names. For example, one subframe may be referred to as a "transmission time interval (TTI)," or a plurality of contiguous subframes may be referred to as a "TTI," or one slot or one mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms.

Here, a TTI refers to the minimum time unit for scheduling in radio communication, for example. For example, in LTE systems, a radio base station schedules the radio resources (such as the frequency bandwidth and/or transmission power each user terminal can use) to allocate to each user terminal in TTI units. Note that the definition of TTIs is not limited to this. The TTI may be the transmission time unit of channel-encoded data packets (transport blocks), or may be the unit of processing in scheduling, link adaptation and so on. Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit for scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," a "partial TTI (or a "fractional TTI")," a "shortened subframe," a "short subframe," and so on.

A resource block (RB) is the unit of resource allocation in the time domain and the frequency domain, and may include one or more contiguous subcarriers in the frequency domain. Also, an RB may include one or more symbols in the time domain, and may be one slot, one mini-slot, one subframe or one TTI in length. One TTI and one subframe may be each comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are simply examples. For example, configurations pertaining to the number of subframes included in a radio frame, the number of slots per subframe or radio frame, the number of mini-slots included in a slot, the number of symbols included in a slot or a mini-slot, the number of subcarriers included in an RB, the number of symbols in a TTI, the duration of symbols, the length of cyclic prefixes (CPs) and so on can be variously changed.

Also, the information and parameters described in this specification may be represented in absolute values or in relative values with respect to given values, or may be represented using other applicable information. For example, radio resources may be specified by given indices.

In addition, equations and/or the like to use these parameters may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers, and/or from lower layers to higher layers. Information, signals and so on may be input and/or output via a plurality of network nodes.

The information, signals and so on that are input and/or output may be stored in a specific location (for example, in a memory), or may be managed using a control table. The information, signals and so on to be input and/or output can be overwritten, updated, or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling, etc.), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an "RRC connection setup message," "RRC connection reconfiguration message," and so on. Also, MAC signaling may be reported using, for example, MAC control elements (MAC CEs (Control Elements)).

Also, given information (for example, an indication to the effect "X holds") does not necessarily have to be indicated explicitly, and may be indicated in an implicit way (for example, by not reporting this given piece of information, by reporting another piece of information and so on). Decisions may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, instructions, information and so on may be transmitted and received via communication media. For example, when software is transmitted from a website, a server or other remote sources by using wired technologies (coaxial cables, optical fiber cables, twisted-pair cables, digital subscriber lines (DSL) and so on), and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other suitable terms.

Furthermore, the radio base stations in this specification may be interpreted as "user terminals," For example, the examples/embodiments of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, "uplink" and/or "downlink" may be interpreted as "sides." For example, an "uplink channel" may be interpreted as a "side channel."

Likewise, the user terminals in this specification may be interpreted as "radio base stations." In this case, the radio base stations 10 may have the functions of the user terminals 20 described above.

Given actions which have been described in this specification to be performed by base stations may, in some cases, be performed by their upper nodes. In a network comprised of one or more network nodes with base stations, it is clear that various operations that are performed to communicate with terminals can be performed by base stations, one or more network nodes other than base stations (for example, MMEs (Mobility Management Entities), S-GWs (Serving-Gateways) and so on may be applicable, but these are not limiting) or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.16 (Wi-Fi (registered trademark)), IEEE 802.16 (WiMAX (registered trademark)), IEEE 802.20, UWB (Ultra-WideBand), Bluetooth (registered trademark), and other adequate radio communication methods, and/or next-generation systems that are enhanced based on these.

The phrase "based on" as used in this specification does not mean "based only on" unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database, or some other data structure), ascertaining, and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical, or a combination of these. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended not to be an exclusive disjunction.

Now, although the present invention has been described in detail above, it should be obvious to a person skilled in the art that the present invention is by no means limited to the embodiments described herein. The present invention can be implemented with various corrections and modifications, without departing from the spirit and scope of the present invention defined by the recitations of claims. Consequently, the description herein is provided only for the purpose of explaining examples, and should by no means be construed to limit the present invention in any way.

The invention claiemd is:

1. A terminal comprising:
    a receiver that receives a downlink control information (DCI) of a given DCI format in a first partial frequency band (BWP) out of a plurality of BWPs configured in a cell; and
    a processor that, when a second BWP different from the first BWP is indicated by a BWP indication field of the DCI of the given DCI format, controls activation of the second BWP, based on the BWP indication field,
    wherein the processor determines bits to be employed in a frequency-domain RA field included in the DCI taking into account a first size of a first frequency-domain resource allocation (RA) field corresponding to the first BWP and a second size of a second frequency-domain RA field corresponding to the second BWP, and
    wherein, when the first size is smaller than the second size, the processor sets given bits in a frequency-domain RA field, included in the DCI, to zero.

2. The terminal according to claim 1, wherein, when the first size is larger than the second size, the processor uses given lower bits (LSB) in a frequency-domain RA field included in the DCI.

3. A radio communication method for a terminal, comprising:
    receiving a downlink control information (DCI) of a given DCI format in a first partial frequency band (BWP) out of a plurality of BWPs configured in a cell; when a second BWP different from the first BWP is indicated by a BWP indication field of the DCI of the given DCI format, controlling activation of the second BWP, based on the BWP indication field;
    determining bits to be employed in a frequency-domain RA field included in the DCI taking into account a first size of a first frequency-domain resource allocation (RA) field corresponding to the first BWP and a second size of a second frequency-domain RA field corresponding to the second BWP; and
    setting given bits in a frequency-domain RA field, included in the DCI, to zero, when the first size is smaller than the second size.

4. A base station comprising:
a transmitter that transmits a downlink control information (DCI) of a given DCI format in a first partial frequency band (BWP) out of a plurality of BWPs configured in a cell; and
a processor that, when a BWP indication field of the DCI of the given DCI format indicates a second BWP different from the first BWP, controls activation of the second BWP, based on the BWP indication field,
wherein, when a first size of a first frequency-domain resource allocation (RA) field corresponding to the first BWP is smaller than a second size of a second frequency-domain RA field corresponding to the second BWP, given bits in a frequency-domain RA field, included in the DCI, is zero.

5. A system comprising a terminal and a base station, wherein:
the terminal comprises:
a receiver that receives a downlink control information (DCI) of a given DCI format in a first partial frequency band (BWP) out of a plurality of BWPs configured in a cell; and
a first processor that, when a second BWP different from the first BWP is indicated by a BWP indication field of the DCI of the given DCI format, controls activation of the second BWP, based on the BWP indication field,
wherein the first processor determines bits to be employed in a frequency-domain RA field included in the DCI taking into account a first size of a first frequency-domain resource allocation (RA) field corresponding to the first BWP and a second size of a second frequency-domain RA field corresponding to the second BWP, and
wherein, when the first size is smaller than the second size, the first processor sets given bits in a frequency-domain RA field, included in the DCI, to zero; and
the base station comprises:
a transmitter that transmits the DCI; and
a second processor that controls activation of the second BWP.

* * * * *